United States Patent
Constantinescu et al.

(10) Patent No.: US 9,608,906 B2
(45) Date of Patent: Mar. 28, 2017

(54) METHODS, SYSTEMS, AND COMPUTER READABLE MEDIA FOR IDENTIFYING NETWORK LOCATIONS ASSOCIATED WITH ENDPOINTS

(71) Applicant: Ixia, Calabasas, CA (US)

(72) Inventors: Mihail Florin Constantinescu, Bucharest (RO); Marius Pavel Nistor, Bucharest (RO)

(73) Assignee: Ixia, Calabasas, CA (US)

( * ) Notice: Subject to any disclaimer, the term of this patent is extended or adjusted under 35 U.S.C. 154(b) by 74 days.

(21) Appl. No.: 14/619,039

(22) Filed: Feb. 10, 2015

(65) Prior Publication Data
US 2016/0234113 A1    Aug. 11, 2016

(30) Foreign Application Priority Data
Feb. 9, 2015 (RO) .............................. A/00087/2015

(51) Int. Cl.
   H04L 12/741 (2013.01)
   H04L 12/751 (2013.01)
(52) U.S. Cl.
   CPC ............ H04L 45/745 (2013.01); H04L 45/02 (2013.01)
(58) Field of Classification Search
   None
   See application file for complete search history.

(56) References Cited

U.S. PATENT DOCUMENTS

| | | | |
|---|---|---|---|
| 8,065,418 B1 * | 11/2011 | Abuan | H04L 29/125 709/227 |
| 2004/0240468 A1 | 12/2004 | Chin et al. | |
| 2005/0226194 A1 | 10/2005 | Fan et al. | |
| 2008/0072312 A1 * | 3/2008 | Takeyoshi | H04L 12/4641 726/15 |

(Continued)

FOREIGN PATENT DOCUMENTS

| WO | WO 03/069493 A1 | 8/2003 |
|---|---|---|
| WO | WO 2016/130280 A1 | 8/2016 |

OTHER PUBLICATIONS

Commonly-assigned, co-pending U.S. Patent Application for "Methods, Systems, and Computer Readable Media for Facilitating the Resolving of Endpoint Hostnames in Test Environments with Firewalls, Network Address Translatores (NATs), or Clouds," (Unpublished, filed Feb. 10, 2015).

(Continued)

*Primary Examiner* — Charles C Jiang
*Assistant Examiner* — George Atkins, Jr.
(74) *Attorney, Agent, or Firm* — Jenkins, Wilson, Taylor & Hunt, P.A.

(57) ABSTRACT

Methods, systems, and computer readable media for identifying network locations associated with endpoints are disclosed. According to one exemplary method, the method occurs at a registration server including at least one processor and configured to operate in a public network or a semi-public network. The method includes receiving, from an endpoint, a packet including a payload containing a first address associated with the endpoint. The method also identifying a second address from a header of the packet. The method further includes determining, using the first address or the second address, whether to initiate a connection with the endpoint for determining a network location associated with the endpoint.

15 Claims, 8 Drawing Sheets

(56) References Cited

U.S. PATENT DOCUMENTS

| | | |
|---|---|---|
| 2009/0040942 A1 | 2/2009 | Yang |
| 2009/0154363 A1 | 6/2009 | Stephens |
| 2010/0183151 A1 | 7/2010 | Wing et al. |
| 2011/0010413 A1 | 1/2011 | Christenson et al. |
| 2012/0078547 A1 | 3/2012 | Murdoch |
| 2013/0272322 A1 | 10/2013 | Sagarwala et al. |
| 2016/0156541 A1 | 6/2016 | Nistor et al. |
| 2016/0173444 A1 | 6/2016 | Nistor |
| 2016/0174178 A1 | 6/2016 | Nistor |
| 2016/0234163 A1 | 8/2016 | Nistor et al. |

OTHER PUBLICATIONS

Commonly-assigned, co-pending U.S. Appl. No. 14/574,359 for "Methods, Systems, and Computer Readable Media for Initiating and Executing Performance Tests of a Private Network and/or Components Thereof," (Unpublished, filed Dec. 17, 2014).

Commonly-assigned, co-pending U.S. Appl. No. 14/572,746 for "Methods, Systems, and Computer Readable Media for Receiving a Clock Synchronization Message," (Unpublished, filed Dec. 16, 2014).

Commonly-assigned, co-pending U.S. Appl. No. 14/557,418 for "Methods, Systems, and Computer Readable Media for Receiving Test Configuration Information," (Unpublished, filed Dec. 1, 2014).

"UDP hole punching," Wikipedia, http://en.wikipedia.org/wiki/UDP_hole_punching, (Nov. 25, 2014).

Marius Pavel Nistor, "Application Mixes Add New Levels of Realism to IxChariot 8 Network Testing," Ixia, (Aug. 1, 2014).

Notification of Transmittal of the International Search Report and the Written Opinion of the International Searching Authority, or the Declaration for International Application No. PCT/US2016/013827 (May 2, 2016).

Non-Final Office Action for U.S. Appl. No. 14/572,746 (Aug. 24, 2016).

\* cited by examiner

| IP ADDRESS | NETWORK LOCATION |
|---|---|
| 121.16.0.16 | PUBLIC |
| 10.205.12.120 | PRIVATE |
| 74.20.0.16 | CLOUD |
| 2001:0db8:57a3:0000:0000:8a2e:0370:7334 | PUBLIC/CLOUD |
| 1008:0bb6:85a3:0000:0000:6a2d:0732:7762 | PRIVATE |

FIG. 8

METHODS, SYSTEMS, AND COMPUTER READABLE MEDIA FOR IDENTIFYING NETWORK LOCATIONS ASSOCIATED WITH ENDPOINTS

PRIORITY CLAIM

This application claims the benefit of Romanian Patent Application No. A/00087/2015, filed Feb. 9, 2015; the disclosure of which is incorporated herein by reference in its entirety.

TECHNICAL FIELD

The subject matter described herein relates to test configuration. More specifically, the subject matter relates to methods, systems, and computer readable media for identifying network locations associated with endpoints.

BACKGROUND

Network operators typically test network nodes for reliability and other characteristics before deploying the network nodes in live (e.g., non-test environments). Generally, when testing, it is important to know the network locations of various nodes or endpoints so as to avoid or mitigate issues involving firewall and/or network address translation (NAT) devices that may block or prevent communications. For example, a firewall may prevent an incoming connection from a public network node to a private network node, but may allow an outgoing connection from the private network node to the public network node. In this example, by knowing the network locations of the endpoints, a network operator may configure the private network node to initiate a connection with the public network node so as to prevent firewall obstruction and ensure a successful connection.

When faced with the problem of determining network locations (e.g., a public network, a semi-public (e.g., cloud) network, or a private network) associated with endpoints, a conventional solution has been for a user to manually determine and input information about the network locations. However, manually determining and inputting such data is inconvenient to the user, especially for large setups, and can be confusing and error-prone.

Accordingly, a need exists for improved methods, systems, and computer readable media for identifying network locations associated with endpoints.

SUMMARY

Methods, systems, and computer readable media for identifying network locations associated with endpoints are disclosed. According to one exemplary method, the method occurs at a registration server including at least one processor and configured to operate in a public network or a semi-public network. The method includes receiving, from an endpoint, a packet including a payload containing a first address associated with the endpoint. The method also includes identifying a second address from a header of the packet. The method further includes determining, using the first address or the second address, whether to initiate a connection with the endpoint for determining a network location associated with the endpoint.

According to one exemplary system, the system includes a registration server including at least one processor. The registration server is configured to operate in a public or semi-public network. The registration server is also configured to receive, from an endpoint, a packet including a payload containing a first address associated with the endpoint, to identify a second address from a header of the packet, and to determine, using the first address or the second address, whether to initiate a connection with the endpoint for determining a network location associated with the endpoint.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for identifying network locations associated with endpoints. When testing endpoints (e.g., nodes or software executing on computing platform), the endpoints that generate network traffic and measure the network performance can be placed in various environments. Some endpoints may be completely open to incoming connections (e.g., public endpoints), others may be protected by firewalls under the user control (e.g., semi-public endpoints), while others are protected by firewalls outside of the user control, which block all incoming connections (e.g., private endpoints). Knowing the location of each endpoint in the test can be important for determining how to initiate the test connections between endpoints. For example, when testing endpoints both inside and outside a private network, some connections can only be initiated from inside to outside (from a private endpoint to a public or cloud endpoint), because a related firewall in the private network will block any incoming connection.

In accordance with some aspects of the subject matter described herein, techniques for determining or identifying a network location associated with an endpoint may include receiving address information from an endpoint and attempting to initiate communications with the endpoint, where the outcome of the initiation and other information may be used to determine or identify a network location associated with the endpoint. For example, assuming a registration server is located in a public network, the registration server or related device may receive, from an endpoint, a registration message or keep-alive message containing address information in a payload and the same or different address information in a header. If the address information in the header is also included in the address information in the payload, the registration server or related device may determine or infer that the endpoint is located in a public network. If the address information in the header is not included in the address information in the payload, the registration server or related device may use the header address information to attempt to establish a TCP or UDP connection with the endpoint. If the TCP or UDP connection is established, the registration server or related device may determine or infer that the endpoint is located in a public network or a semi-public network. If the TCP or UDP connection is not established, the registration server or related device may determine or infer that the endpoint is located in a private network Advantageously, in accordance with some aspects of the subject matter described herein, by automatically determining or identifying network locations associated with endpoints, a network topology may be determined. Further, in accordance with some aspects of the subject matter described herein, a test platform or other device may use identified network locations when determining which endpoints should initiate connections with other endpoints, e.g., since some endpoints (e.g., those located in a private network) may have incoming connections (e.g., from endpoints located in a public network) blocked or discarded by intervening security related devices (e.g., a firewall and/or NAT device).

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
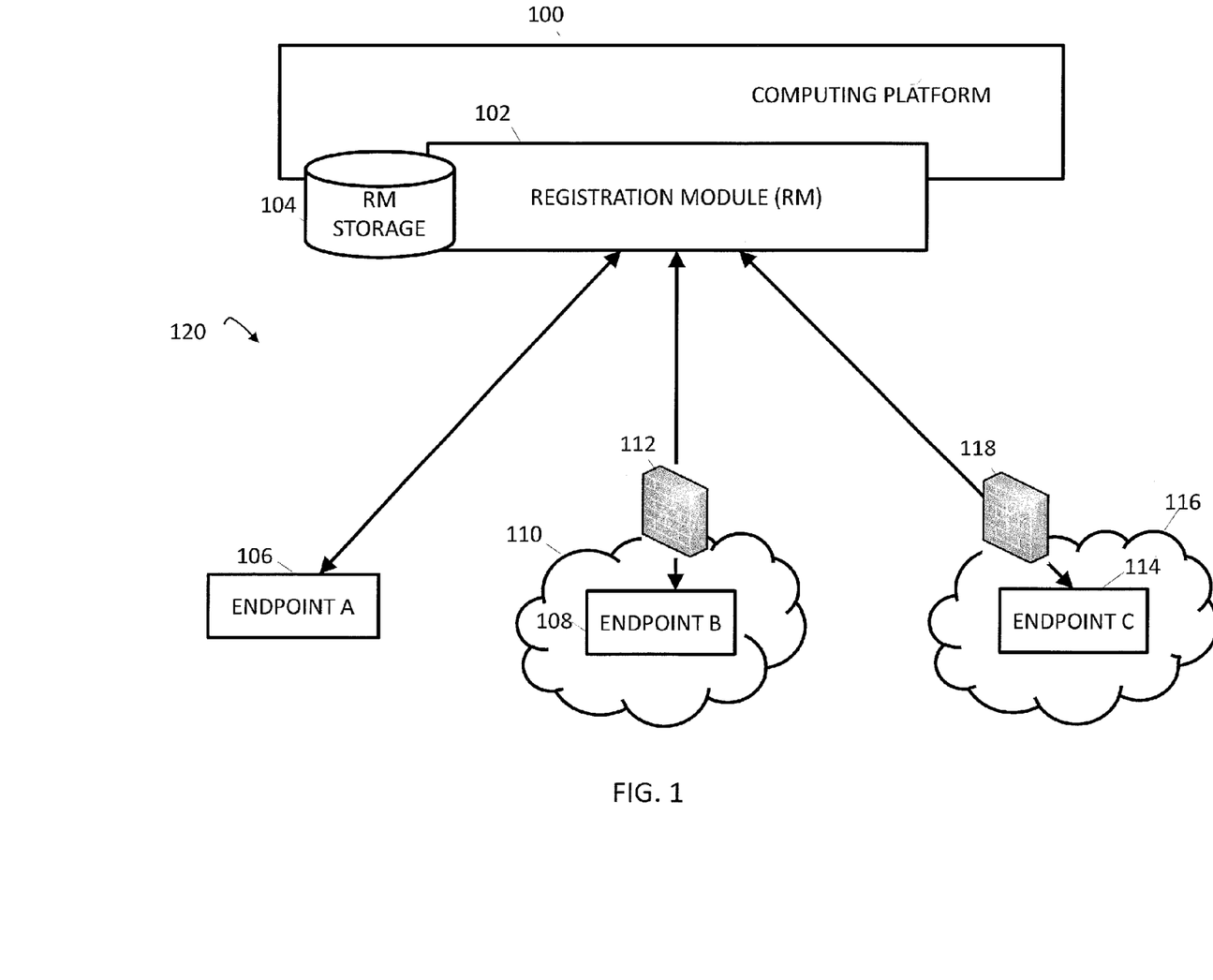
FIG. 1 is a diagram illustrating an exemplary computing platform for identifying network locations associated with endpoints according to an embodiment of the subject matter described herein.

FIG. 1 is a diagram illustrating an exemplary computing platform 100 for registering an endpoint according to an embodiment of the subject matter described herein. Referring to FIG. 1, computing platform 100 may represent a network device, a network module, a node, or a system of devices, nodes, and/or modules. For example, computing platform 100 may be a registration server or another node configured to operate in a public network (e.g., not located behind one or more security related devices, such as a firewall device or a NAT device) and/or a semi-public network (e.g., located behind one or more security related devices that are configured to allow incoming connections from out-of-network endpoints). In some embodiments, computing platform 100 may be a single node or may include functionality distributed across multiple computing platforms or nodes.

Computing platform 100 may include or access a registration module (RM) 102. RM 102 may represent any suitable entity or entities (e.g., a computing platform, software executing on a processor, etc.) for performing one or more aspects associated with registering endpoint related information. In some embodiments, RM 102 may include the functionality for interacting with other users, systems, endpoints, and/or nodes. For example, RM 102 may include one or more communications interfaces for receiving and sending various types of messages; such as IP messages, IP version 4 (IPv4) messages, IP version 6 (IPv6) messages, transmission control protocol (TCP) messages, stream control transmission protocol (SCTP) messages, real-time transport protocol (RTP) messages, reliable data protocol (RDP) messages, general packet radio service (GPRS) tunneling protocol (GTP) messages, messages using another tunneling protocol, and/or other messages.

In some embodiments, computing platform 100 and/or RM 102 may include functionality associated with a registration server in a test environment. For example, a test environment may involve numerous endpoints (e.g., nodes and/or applications hosted on or executed by computing platforms) configured to send traffic for testing purposes. In this example, computing platform 100 and/or RM 102 may be configured to receive registration information periodically and/or aperiodically (e.g., dynamically) from the endpoints and to provide information about the endpoints to a test operator, e.g., via a test console.

Additional details regarding exemplary test environments and related functionality may be found in U.S. patent application Ser. No. 14/557,418, entitled METHODS, SYSTEMS, AND COMPUTER READABLE MEDIA FOR RECEIVING TEST CONFIGURATION INFORMATION, filed on Dec. 1, 2014, and in U.S. patent application Ser. No. (to be assigned), entitled METHODS, SYSTEMS, AND COMPUTER READABLE MEDIA FOR FACILITATING THE RESOLVING OF ENDPOINT HOSTNAMES IN TEST ENVIRONMENTS WITH FIREWALLS, NETWORK ADDRESS TRANSLATORS (NATS), OR CLOUDS, filed on an even date herewith; the disclosures of the related applications referenced herein are hereby incorporated by reference in their entireties.

In some embodiments, computing platform 100 and/or RM 102 may include functionality for communicating with endpoint A 106, endpoint B 108, and/or endpoint C 114. Each of endpoint A 106, endpoint B 108, and/or endpoint C 114 may represent any suitable entity (e.g., software being executed on a processor associated with a computing platform or a node) for communicating with computing platform 100 and/or RM 102 and/or for providing registration information (e.g., endpoint related information and/or address information) to computing platform 100 and/or RM 102. In some embodiments, endpoint A 106, endpoint B 108, and/or endpoint C 114 may be located or in a public network 120, a private network 110, or a semi-public network 116.

In some embodiments, public network 120 may represent a network that allows communications from various entities and/or other networks. For example, public network 120 may not include a firewall or other security related device(s) for blocking incoming connection requests (e.g., TCP connection requests or UDP connection requests) from other networks. In another example, public network 120 may not include a NAT device that performs NAT related functions. In some embodiments, public network 120 may be the same network or a different public network associated with computing platform 100 and/or RM 102.

In some embodiments, private network 110 (e.g., an enterprise network) may represent a network that includes one or more security related device(s) 112. Security related device(s) 112 may represent any suitable entity or entities for monitoring and/or possibly affecting communications between entities within private network 110 and entities elsewhere, e.g., in public network 120 or semi-public network 116. For example, security related device(s) 112 may include a firewall device configured to block all incoming connection requests from public network 120 or semi-public network 116 to private network 110, but configured to allow outgoing connection requests from private network 110 to public network 120 or semi-public network 116. In another example, security related device(s) 112 may include a NAT device that performs NAT related functions by replacing private address information (e.g., a private IP address usable for routing packets within private network 110) in a packet header with public address information (e.g., a public IP address usable for routing packets within public network 120).

In some embodiments, a semi-public network 116 (e.g., a cloud network or a cloud service network) may represent a network (e.g., Amazon Cloud Drive, Microsoft Azure, etc.) that includes one or more security related device(s) 118. Security related device(s) 118 may represent any suitable entity or entities for monitoring and/or possibly affecting communications between entities within semi-public network 116 and entities elsewhere, e.g., in public network 120 or private network 110. For example, security related device(s) 118 may include a firewall device configured to block some, all, or none of the incoming connection requests from public network 120 or private network 110.

In some embodiments, security related device(s) 118 may be under user control and may be configured to allow traffic (e.g., from public network 120 or private network 110) to reach endpoints in semi-public network 116 (e.g., by disabling security related device(s) 118 or by opening up an appropriate port). In some embodiments, security related device(s) 118 may include a NAT device that performs NAT related functions by replacing private address information (e.g., a private IP address usable for routing packets within semi-public network 116) in a packet header with public address information (e.g., a public IP address usable for routing packets within public network 120), e.g., such that incoming traffic is received by endpoints in semi-public network 116.

In some embodiments, computing platform 100 and/or RM 102 may include functionality for automatically determining or identifying network locations associated with endpoints. For example, RM 102 may include network location detection logic and/or a related algorithm for determining whether an endpoint is reachable via provided or inferred address information. In this example, RM 102 may attempt to initiate or establish a connection (e.g., a TCP connection) with an endpoint and to infer a network location associated with the endpoint based, in part, on whether the connection was successful. Continuing with this example, RM 102 may use the outcome of the connection attempt and some other information (e.g., software-implemented logic that assumes that an endpoint behind a firewall in private network 110 will not be able to receive incoming connections from RM 102) to determine or identify a network location as public network 120, private network 110, or semi-public network 116.

In some embodiments, computing platform 100 and/or RM 102 may include functionality for providing information to a user or a requesting entity. For example, computing platform 100 and/or RM 102 may provide a network location associated with a first endpoint to enable a requesting entity to instruct a first endpoint to initiate a test connection and/or session with a second endpoint. In this example, the requesting entity may transmit to RM 102, in a test related message, an address associated with one endpoint that the requesting entity is interested in testing. The test related message may include a request to computing platform 100 and/or RM 102 for identifying a network location associated with the address information that has previously been received, and subsequently stored, by RM 102. RM 102 may then include functionality for identifying the network location and for transmitting the network location associated with the endpoint back to the requesting entity so that the requesting entity may configure a test connection or session between two endpoints.

In some embodiments, the requesting entity may use a network location associated with an endpoint for instructing an endpoint to initiate a test connection or session between another endpoint, where each of the two endpoints may be hosted or located in a different network (e.g., public, private, cloud). However, since test connection initiation is dependent on location of each involved endpoint (e.g., an endpoint located in a public or cloud network cannot initiate a test connection with a node located in a private network), the requesting entity may use the associated address to determine the network location of the endpoint for determining at which endpoint should the connection be initiated.

In some embodiments, when initiating a test involving multiple endpoints, a requesting entity (e.g., a test platform or related application) may communicate with RM 102 to determine or identify network locations associated with the endpoints. Based on this information, the requesting entity may determine how to initiate the TCP connections. For example, if the requesting entity has a test plan involving a public or semi-public endpoint initiating a connection with a private endpoint, after receiving network location information, the requesting entity may change the test plan such that the private endpoint initiates the connection with the public endpoint or may utilize a technique (e.g., UDP hole punching at a relevant firewall) for allowing incoming connections from a public network to a private network, thereby improving the chances that a connection will be established.

In some embodiments, computing platform 100, RM 102, and/or another entity may include functionality for using identified network locations associated with endpoints to generate and/or provide a network topology. For example, a user may request that RM 102 provide a graphical depiction of various endpoints based on identified network locations associated with the various endpoints. In this example, the various endpoints may be depicted as existing in either a public network, a semi-public network, or a private network.

In some embodiments, computing platform 100 and/or RM 102 may be configured to register or store address information, a related network location, and/or other endpoint related information. In some embodiments, registration information may be stored in a storage device (e.g., RM storage, 104) integrated with or accessible by RM 102, computing platform 100, or modules therein. In some embodiments, RM storage 104 may be located at a node distinct from RM 102 and/or computing platform 100. For example, RM storage 104 may be associated with a storage device separate from computing platform 100.

RM storage 104 may represent any suitable entity (e.g., a non-transitory computer readable medium, embedded memory, or a memory device) for storing data associated with endpoints, message flows, messages, test traffic, test results, statistics, and/or test related information. Exemplary data stored at RM storage 104 may include registration information, network location information, address information, port information, proxy information, node identification information, test configuration information, test results, statistics, and/or other information.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
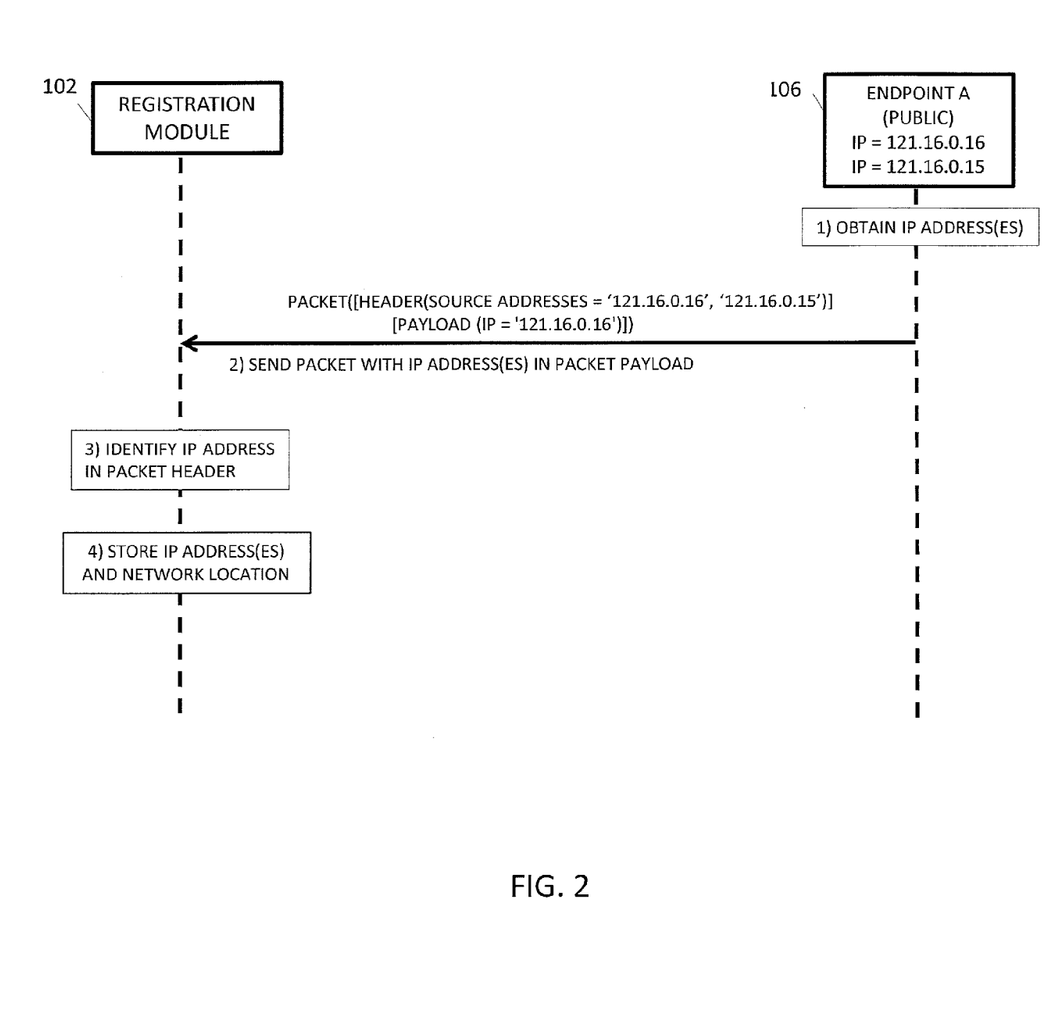
FIG. 2 is a diagram illustrating identifying a network location associated with an endpoint in a public network according to an embodiment of the subject matter described herein.

FIG. 2 is a diagram illustrating identifying a network location associated with an endpoint in a public network according to an embodiment of the subject matter described herein. In some embodiment, endpoint A 106 may be located in public network 120 and may attempt to communicate and/or register with computing platform 100 and/or RM 102.

Referring to FIG. 2, in step 1, endpoint A 106 may obtain or otherwise determine one or more IP addresses (e.g., IPv4 or IPv6 addresses) for communicating with various nodes. In some embodiments, address information may be preconfigured by a user or may be determined by endpoint A 106. For example, at an initialization time, endpoint A 106 may be configured to use multiple IPv4 addresses assigned by a network operator or a provisioning entity. In this example, the IPv4 addresses may be usable for receiving or sending communications via communications interfaces at endpoint A 106.

In step 2, endpoint A 106 may send a packet or message (e.g., a registration message, a UDP message, a TCP SYN message, or a TCP Keep-Alive message) containing address information to computing platform 100 and/or RM 102. For example, endpoint A 106 may include, in the packet or message, a payload containing one or more IP addresses (e.g., a public IP address) from a plurality of IP addresses associated with endpoint A 106. In this example, endpoint A 106 may also include, in a header of the packet or message, one of the IP addresses associated with endpoint A 106 as a source address parameter value.

In some embodiments, if endpoint A 106 has multiple communications interfaces, endpoint A 106 may include in the payload all of its IP addresses for communicating with the multiple communications interfaces.

In some embodiments, e.g., if endpoint A 106 has multiple communications interfaces, endpoint A 106 may establish a connection to RM 102 or a related device, and may determine which one of the multiple communications interfaces will be used as the source for the connection, and may include an IP address associated with that particular communications interface in the payload and in the header.

In step 3, after receiving the packet or message, RM 102 may inspect the information in the payload of the packet or message to obtain one or more IP addresses. RM 102 may also inspect a header of the packet or message and infer or identify source address information (e.g., an IP address associated with endpoint A 106) from the header.

In some embodiments, RM 102 may determine whether the header address information is included in the payload address information. For example, if a payload includes five IP addresses, then RM 102 may determine whether one of the five IP addresses is the same as the source IP address in the header. If the address information in the payload includes the source address information in the header, RM 102 may be configured to determine or infer that endpoint A 106 is associated with public network 120, e.g., without attempting to initiate a connection using received address information. For example, RM 102 may determine or infer that endpoint A 106 is associated with public network 120 based, at least in part, on the assumption that RM 102 or a related device is located in public network 120 and that a header IP address being in the payload address information indicates that there is no NAT device between endpoint A 106 and RM 102 or a related device.

In some embodiments (e.g., if the address information in the payload does not include the header address information), a RM 102 may be configured to initiate a connection with endpoint A 106 using source address information identified from a packet header. For example, RM 102 may send a connection request (e.g., a TCP SYN message) addressed to an IP address associated with endpoint A 106 (e.g., a source IP address located in a packet header of a registration message initiated by endpoint A 106). In this example, if endpoint A 106 receives and accepts the connection request, endpoint A 106 may send a connection response message (e.g., a TCP-ACK message) to RM 102. In response to a successful connection, RM 102 may be configured to determine or infer that endpoint A 106 is associated with public network 120.

In step 4, one or more IP addresses and a network location associated with endpoint A 106 may be stored, e.g., at RM storage 104. For example, RM 102 may store an IP address '121.16.0.16' and a network location of 'public' indicating that endpoint A 106 is located in public network 120 and/or that the endpoint is reachable via the associated IP address.

It will be appreciated that FIG. 2 is for illustrative purposes and that different and/or additional actions may be used. It will also be appreciated that various actions described herein may occur in a different order or sequence.

Figure 3:
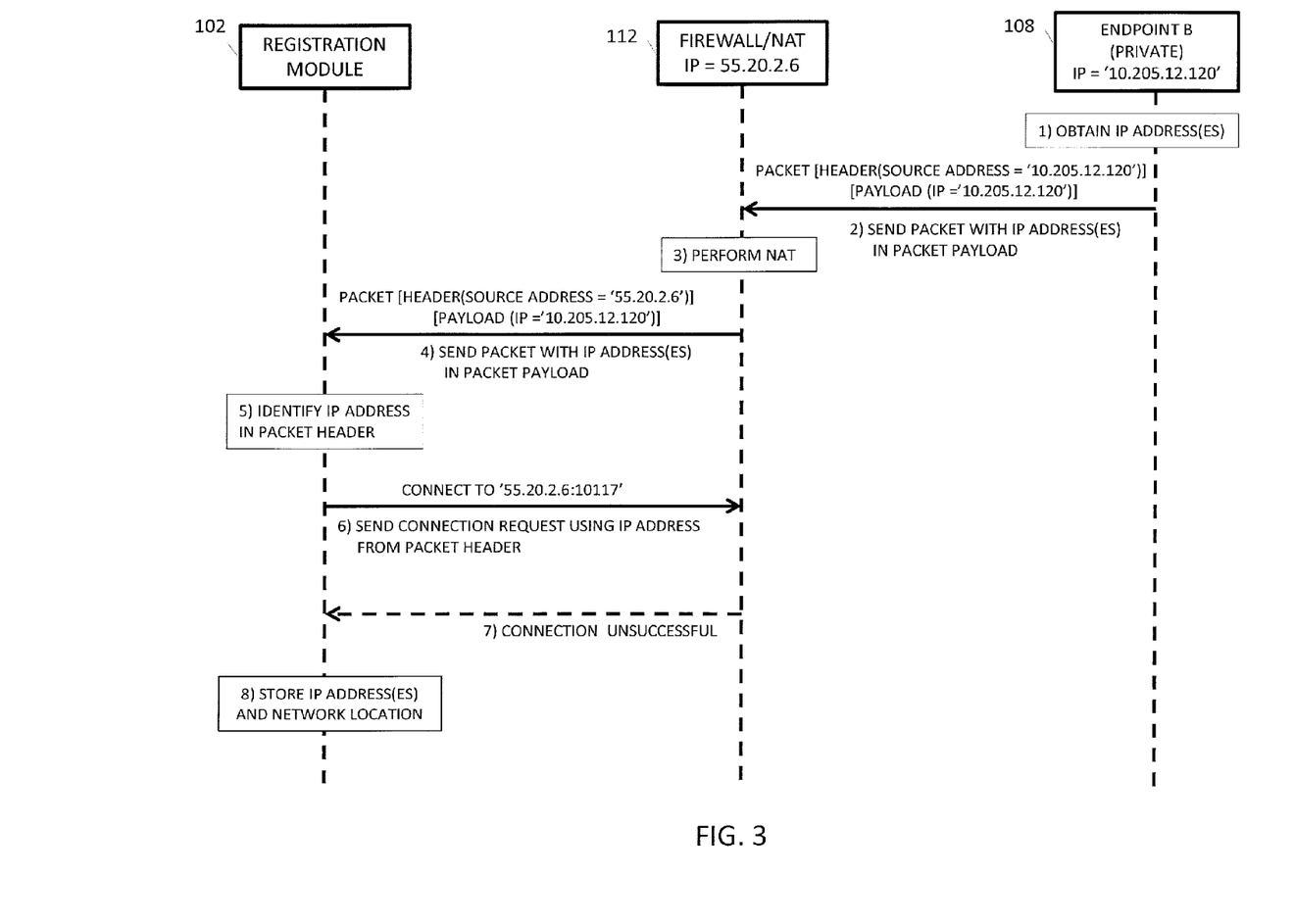
FIG. 3 is a diagram illustrating identifying a network location associated with an endpoint in a private network according to an embodiment of the subject matter described herein.

FIG. 3 is a diagram illustrating identifying a network location associated with an endpoint in a private network according to an embodiment of the subject matter described herein. In some embodiments, endpoint B 108 may be located in private network 110 and may attempt to communicate and/or register with computing platform 100 and/or RM 102. In such embodiments, security related device(s) 112 may be located between RM 102 and endpoint B 108 and may perform firewall and/or NAT related functions.

Referring to FIG. 3, in step 1, endpoint B 108 may obtain or otherwise determine one or more IP addresses (e.g., IPv4 or IPv6 addresses) for communicating with various nodes. In some embodiments, address information may be preconfigured by a user or may be determined by endpoint B 108.

For example, endpoint B 108 may be configured to use one or more IPv4 addresses for receiving and/or sending communications.

In step 2, endpoint B 108 may send a packet or message containing address information to computing platform 100 and/or RM 102. For example, endpoint B 108 may include, in the packet or message, a payload containing one or more IP addresses (e.g., private IP addresses) associated with endpoint B 108. In this example, endpoint B 108 may also include, in a header of the packet or message, an IP address associated with endpoint B 108 as a source address parameter value.

In step 3, security related device(s) 112 may perform NAT related functions associated with the packet or message sent from endpoint B 108. For example, prior to being received by RM 102, security related device(s) 112 may modify a header of a packet or message by replacing source address information (e.g., a private IP address associated with endpoint B 108) in the header with different address information (e.g., a public IP address associated with security related device(s) 112).

In step 4, security related device(s) 112 may send the packet or message containing modified header address information to computing platform 100 and/or RM 102. For example, the packet or message may include a payload containing a private IP address associated with endpoint B 108 and a header containing a public IP address associated with security related device(s) 112.

In step 5, after receiving the packet or message, RM 102 may inspect the information in the payload of the packet or message to obtain one or more IP addresses. RM 102 may also inspect the header of the packet or message and infer or identify source address information (e.g., a public IP address associated with security related device(s) 112) from the header.

In some embodiments, RM 102 may determine whether a NAT device (e.g., security related device(s) 112) is associated with a received packet or message. For example, after receiving a packet, RM 102 may compare a header IP address with payload address information to determine whether the header IP address is included in the payload address information. If the header IP address is not included (e.g., the header IP address is different from all IP addresses in the payload portion), RM 102 may determine or infer that a NAT device is located between endpoint B 108 and RM 102 and, in response, RM 102 may attempt a reverse connection with endpoint B 108 using the header IP address.

In some embodiments, RM 102 may initially assume that security related device(s) 112 is configured in such a way as to allow incoming connections from public network 120 (e.g., from RM 102). For example, when a NAT device is detected, RM 102 may attempt to initiate a connection with endpoint B 108 using the header address. In this example, RM 102 may infer that endpoint B 108 is in semi-public network 116 when the connection is successful and may infer that endpoint B 108 is in private network 110 when the connection is unsuccessful.

In step 6, RM 102 may be configured to initiate a connection with endpoint B 108 using source address information identified from a packet header. For example, RM 102 may send a connection request (e.g., a TCP SYN message) addressed to a public IP address located in a packet header of a registration message initiated by endpoint B 108.

In some embodiments, e.g., if computing platform 100 and/or RM 102 are located in a public network 120 or semi-public network 116, security related device(s) 112 may receive a connection request from computing platform 100 and/or RM 102 and may discard or otherwise prevent communication request from being received by endpoint B 108. Instead, a connection request error message may be sent back to RM 102, a timeout may occur, or another indication may be sent or determined for indicating that the connection was unsuccessful.

In step 7, RM 102 may receive an indication of an unsuccessful connection with endpoint B 108 or may otherwise determine that a connection request was unsuccessful. In response to determining that the connection request was unsuccessful, RM 102 may be configured to determine or infer that endpoint B 108 is associated with private network 110.

In step 8, one or more IP addresses and a network location associated with endpoint B 108 may be stored, e.g., at RM storage 104. For example, RM 102 may store an IP address '10.205.12.120' and a network location of 'private' indicating that endpoint B 108 is located in private network 110 and/or that the endpoint is unreachable via the associated IP address.

It will be appreciated that FIG. 3 is for illustrative purposes and that different and/or additional actions may be used. It will also be appreciated that various actions described herein may occur in a different order or sequence.

Figure 4:
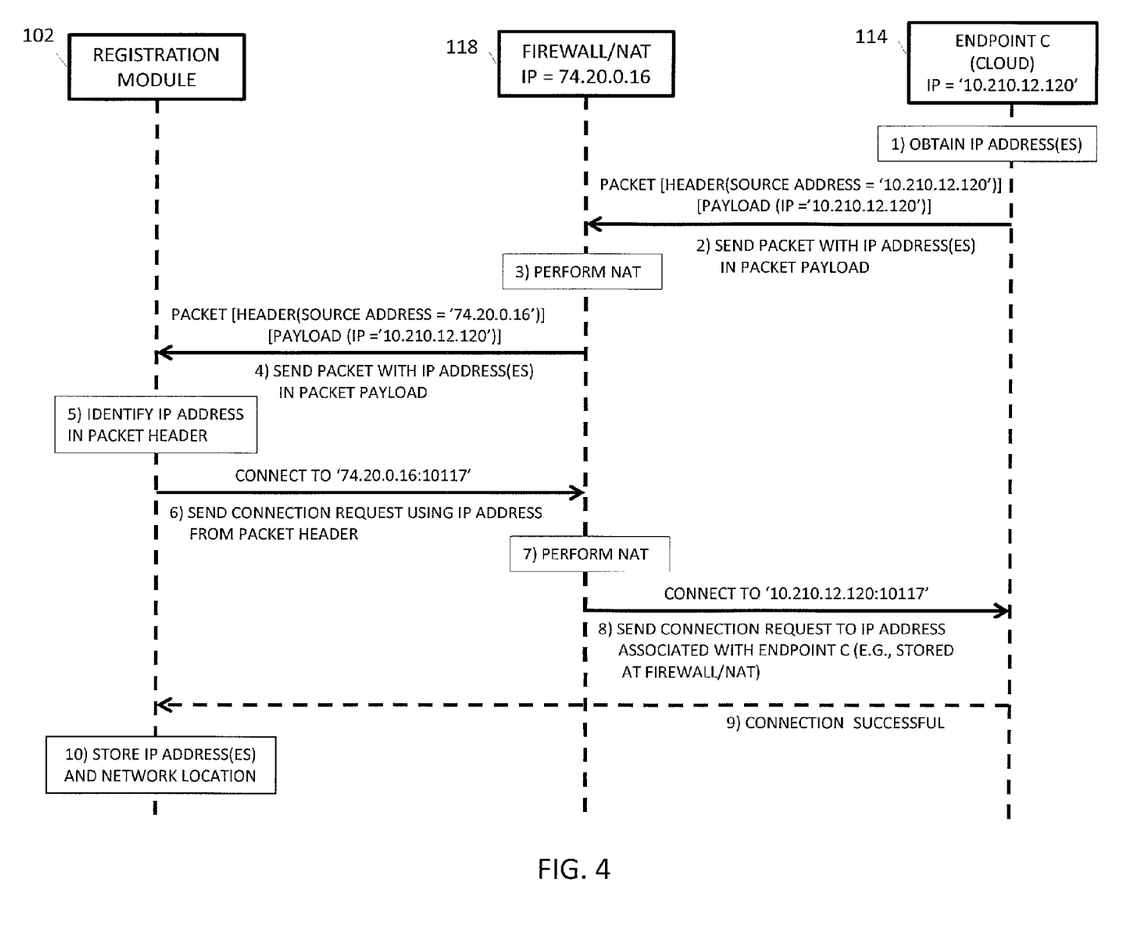
FIG. 4 is a diagram illustrating identifying a network location associated with an endpoint in a cloud network according to an embodiment of the subject matter described herein.

FIG. 4 is a diagram illustrating identifying a network location associated with an endpoint in a cloud network according to an embodiment of the subject matter described herein. In some embodiments, endpoint C 114 may be located in semi-public network 116 and may attempt to communicate and/or register with computing platform 100 and/or RM 102. In such embodiments, security related device(s) 118 may be located between RM 102 and endpoint C 114 and may perform firewall and/or NAT related functions.

Referring to FIG. 4, in step 1, endpoint C 114 may obtain or otherwise determine one or more IP addresses (e.g., IPv4 or IPv6 addresses) for communicating with various nodes. In some embodiments, address information may be preconfigured by a user or may be determined by endpoint C 114. For example, endpoint C 114 may be configured to use one or more IPv4 addresses for receiving and/or sending communications.

In step 2, endpoint C 114 may send a packet or message containing address information to computing platform 100 and/or RM 102. For example, endpoint C 114 may include, in the packet or message, a payload containing one or more IP addresses (e.g., private IP addresses) associated with endpoint C 114. In this example, endpoint C 114 may also include, in a header of the packet or message, an IP address associated with endpoint C 114 as a source address parameter value.

In step 3, security related device(s) 118 may perform NAT related functions associated with the packet or message sent from endpoint C 114. For example, prior to being received by RM 102, security related device(s) 118 may modify a header of a packet or message by replacing source address information (e.g., a private IP address associated with endpoint C 114) in the header with different address information (e.g., a public IP address associated with security related device(s) 118).

In step 4, security related device(s) 118 may send the packet or message containing modified header address information to computing platform 100 and/or RM 102. For example, the packet or message may include a payload containing a private IP address associated with endpoint C 114 and a header containing a public IP address associated with security related device(s) 118.

In step 5, after receiving the packet or message, RM 102 may inspect the information in the payload of the packet or message to obtain one or more IP addresses. RM 102 may also inspect the header of the packet or message and infer or identify source address information (e.g., a public IP address associated with security related device(s) 118) from the header.

In some embodiments, RM 102 may determine whether a NAT device (e.g., security related device(s) 118) is associated with a received packet or message. For example, after receiving a packet, RM 102 may compare a header IP address with payload address information to determine whether the header IP address is included in the payload address information. If the header IP address is not included (e.g., the header IP address is different from all IP addresses in the payload portion), RM 102 may determine or infer that a NAT device is located between endpoint C 114 and RM 102 and, in response, RM 102 may attempt a reverse connection with endpoint C 114 using the header IP address.

In some embodiments, RM 102 may initially assume that security related device(s) 118 is configured in such a way as to allow incoming connections from public network 120 (e.g., from RM 102). For example, when a NAT device is detected, RM 102 may attempt to initiate a connection with endpoint C 114 using the header address. In this example, RM 102 may infer that endpoint C 114 is in semi-public network 116 when the connection is successful and may infer that endpoint C 114 is in private network 110 when the connection is unsuccessful.

In step 6, RM 102 may be configured to initiate a connection with endpoint C 114 using source address information identified from a packet header. For example, RM 102 may send a connection request (e.g., a TCP SYN message) addressed to a public IP address located in a packet header of a registration message initiated by endpoint C 114.

In step 7, security related device(s) 118 may perform NAT related functions associated with the packet or message sent from endpoint C 114. For example, prior to being received by RM 102, security related device(s) 118 may modify a header of a packet or message by replacing source address information (e.g., a public IP address associated with security related device(s) 118) in the header with different address information (e.g., a private IP address associated with endpoint C 114).

In step 8, security related device(s) 118 may send the packet or message containing modified header address information to endpoint C 114. For example, the packet or message may include a header containing a private IP address associated with endpoint C 114.

In some embodiments, the connection request may be received by endpoint C 114 and endpoint C 114 may respond by sending a connection request acknowledgement or other indication to computing platform 100 and/or RM 102 (e.g., via security related device(s) 118).

In step 9, RM 102 may receive an indication of a successful connection with endpoint C 114 or may otherwise determine that a connection request was successful. In response to determining that the connection request was successful, RM 102 may be configured to determine or infer that endpoint C 114 is associated with semi-public network 116.

In step 10, one or more IP addresses and a network location associated with endpoint C 114 may be stored, e.g., at RM storage 104. For example, RM 102 may store an IP address '74.20.0.16' associated with security related device(s) 118 and a network location of 'cloud' indicating that endpoint C 114 is located in semi-public network 116 and/or that the endpoint is reachable via the associated IP address.

It will be appreciated that FIG. 4 is for illustrative purposes and that different and/or additional actions may be used. It will also be appreciated that various actions described herein may occur in a different order or sequence.

Figure 5:
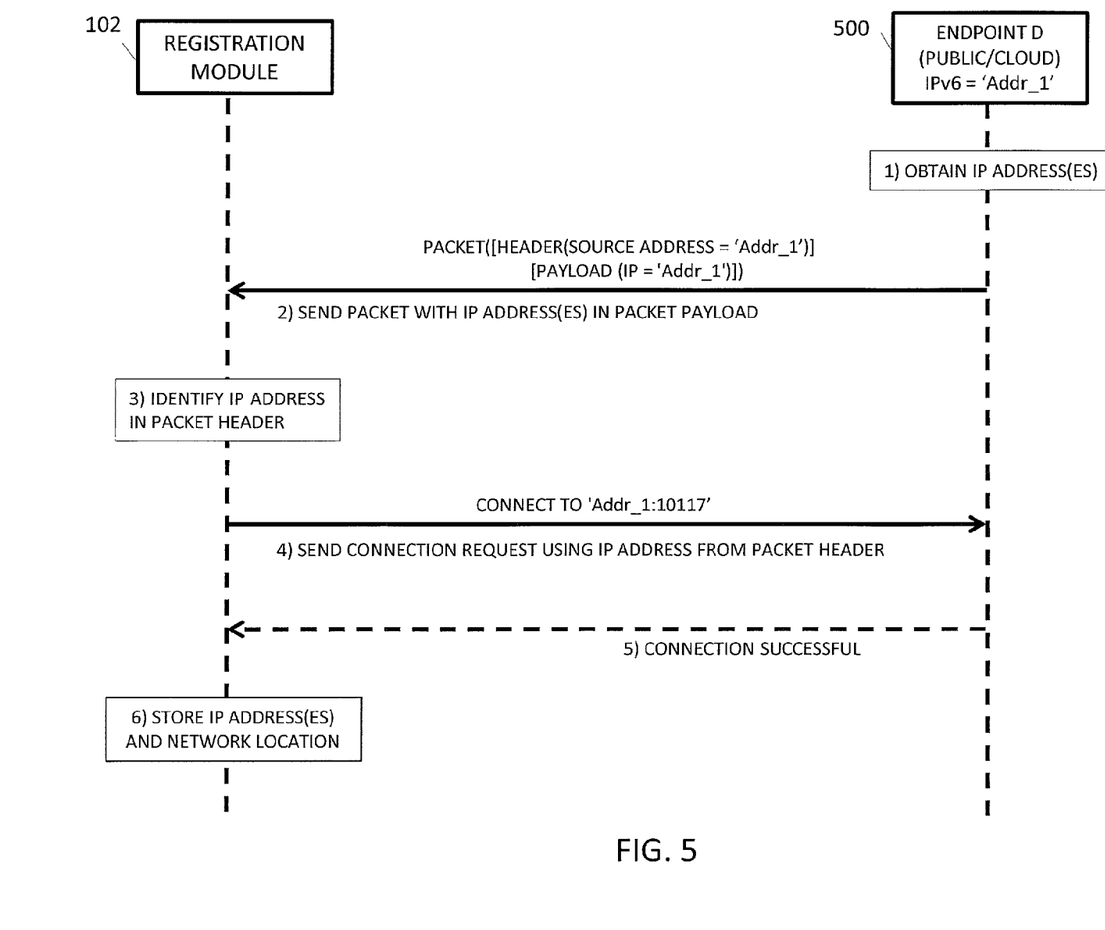
FIG. 5 is a diagram illustrating identifying a network location associated with an endpoint in a public network or a cloud network according to another embodiment of the subject matter described herein.

FIG. 5 is a diagram illustrating identifying a network location associated with an endpoint in a public network or a cloud network according to another embodiment of the subject matter described herein. In some embodiment, endpoint D 500 may be located in public network 120 or semi-public network 116 and may attempt to communicate and/or register with computing platform 100 and/or RM 102. In such embodiments, endpoint D 500 may be configured to use one or more IPv6 addresses, such as '2001:0db8:57a3:0000:0000:8a2e:0370:733', for communicating with computing platform 100 and/or RM 102.

Referring to FIG. 5, in step 1, endpoint D 500 may obtain or otherwise determine one or more IP addresses (e.g., IPv6 addresses) for communicating with various nodes. In some embodiments, address information may be preconfigured by a user or may be retrieved by endpoint D 500. For example, endpoint D 500 may be configured to use an IPv6 address, e.g., represented by 'Addr_1' in FIG. 5.

In step 2, endpoint D 500 may send a packet or message (e.g., a registration message, a UDP message, a TCP SYN message, or a TCP Keep-Alive message) containing address information to computing platform 100 and/or RM 102. For example, endpoint D 500 may include, in the packet or message, a payload containing one or more IP addresses (e.g., IPv6 addresses) associated with endpoint D 500. In this example, endpoint D 500 may also include, in a header of the packet or message, an IP address associated with endpoint D 500 as a source address parameter value.

In step 3, after receiving the packet or message, RM 102 may inspect the information in the payload of the packet or message to obtain one or more IP addresses. RM 102 may also inspect a header of the packet or message and infer or identify source address information (e.g., an IP address associated with endpoint D 500) from the header.

In step 4, RM 102 may be configured to initiate a connection with endpoint D 500 using source address information identified from a packet header. For example, RM 102 may send a connection request (e.g., a TCP SYN message) addressed to an IP address associated with endpoint D 500 (e.g., a source IP address located in a packet header of a registration message initiated by endpoint D 500).

In some embodiments, the connection request may be received by endpoint D 500 and endpoint D 500 may respond by sending a connection request acknowledgement or other indication to computing platform 100 and/or RM 102.

In step 5, RM 102 may receive an indication of a successful connection with endpoint D 500 or may otherwise determine that a connection request was unsuccessful. In response, RM 102 may be configured to determine or infer that endpoint D 500 is associated with public network 120 or semi-public network 116.

In step 6, one or more IP addresses and a network location associated with endpoint C 114 may be stored, e.g., at RM storage 104. For example, RM 102 may store an IP address '2001:0db8:57a3:0000:0000:8a2e:0370:733' associated with security related device(s) 118 and a network location of 'public cloud' indicating that endpoint C 114 is located in public network 120 or semi-public network 116 and/or that the endpoint is reachable via the associated IP address.

It will be appreciated that FIG. 5 is for illustrative purposes and that different and/or additional actions may be used. It will also be appreciated that various actions described herein may occur in a different order or sequence.

Figure 6:
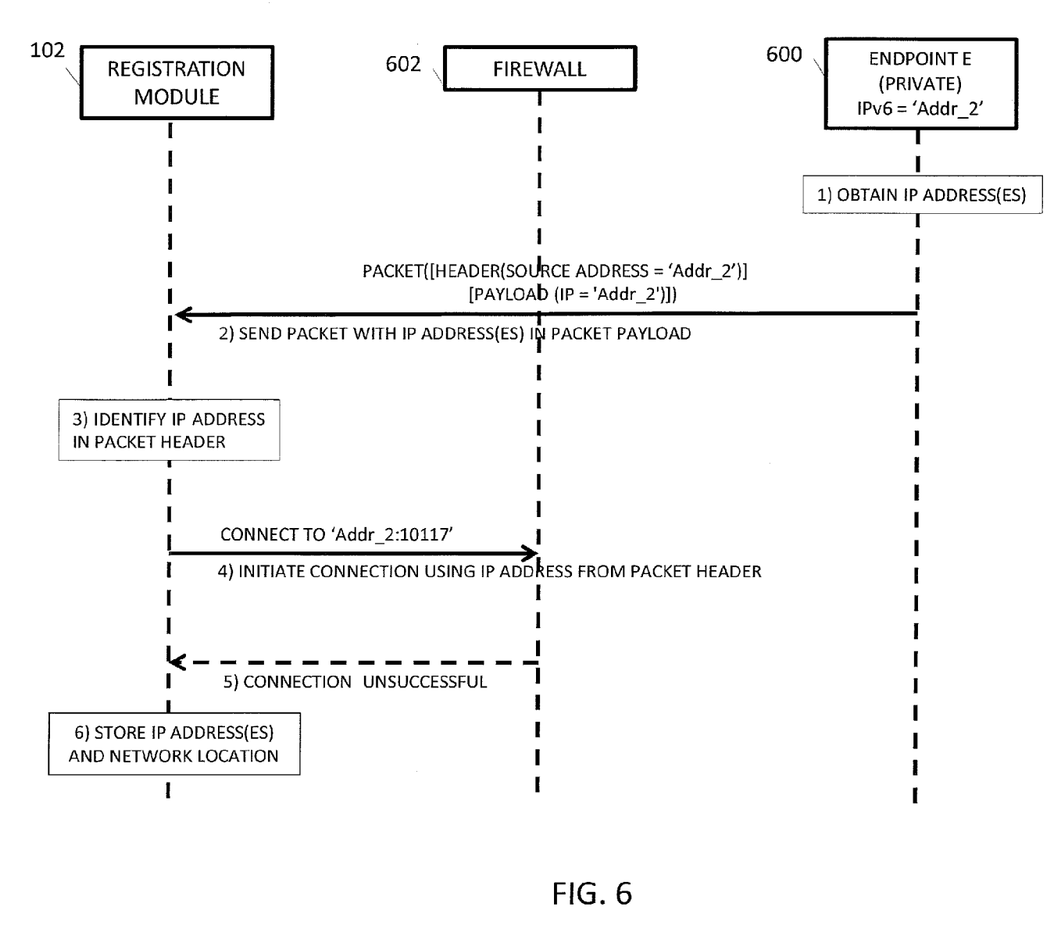
FIG. 6 is a diagram illustrating identifying a network location associated with an endpoint in a private network according to another embodiment of the subject matter described herein.

FIG. 6 is a diagram illustrating identifying a network location associated with an endpoint in a private network according to another embodiment of the subject matter described herein. In some embodiment, endpoint E 600 may be located in private network 110 and may attempt to communicate and/or register with computing platform 100 and/or RM 102. In such embodiments, endpoint E 600 may be configured to use one or more IPv6 addresses, such as '1008:0bb6:85a3:0000:0000:6a2d:0732:7762', for communicating with computing platform 100 and/or RM 102. In some embodiments, security related device(s) 602 may be located between RM 102 and endpoint E 600 and may perform firewall related functions.

Referring to FIG. 6, in step 1, endpoint E 600 may obtain or otherwise determine one or more IP addresses (e.g., IPv6 addresses) for communicating with various nodes. In some embodiments, address information may be preconfigured by a user or may be determined by endpoint E 600. For example, endpoint E 600 may be configured to use an IPv6 address, e.g., represented by 'Addr_2' in FIG. 5.

In step 2, endpoint E 600 may send a packet or message (e.g., a registration message, a UDP message, a TCP SYN message, or a TCP Keep-Alive message) containing address information to computing platform 100 and/or RM 102. For example, endpoint E 600 may include, in the packet or message, a payload containing one or more IP addresses (e.g., IPv6 addresses) associated with endpoint E 600. In this example, endpoint E 600 may also include, in a header of the packet or message, an IP address associated with endpoint E 600 as a source address parameter value.

In some embodiments, security related device(s) 602 may inspect a packet or message sent from endpoint E 600 and may allow the packet or message to traverse security related device(s) 602 and reach computing platform 100 and/or RM 102. For example, security related device(s) 602 may include a firewall to allow all outgoing communications.

In step 3, after receiving the packet or message, RM 102 may inspect the information in the payload of the packet or message to obtain one or more IP addresses. RM 102 may also inspect a header of the packet or message and infer or identify source address information (e.g., an IP address associated with endpoint E 600) from the header.

In step 4, RM 102 may be configured to initiate a connection with endpoint E 600 using source address information identified from a packet header. For example, RM 102 may send a connection request (e.g., a TCP SYN message) addressed to an IP address associated with endpoint E 600 (e.g., a source IP address located in a packet header of a registration message initiated by endpoint E 600).

In some embodiments, e.g., if computing platform 100 and/or RM 102 are located in a public network 120 or semi-public network 116, security related device(s) 602 may receive a connection request from computing platform 100 and/or RM 102 and may discard or otherwise prevent communication request from being received by endpoint E 600. Instead, a connection request error message may be sent back to RM 102, a timeout may occur, or another indication may be sent or determined for indicating that the connection was unsuccessful.

In step 5, RM 102 may receive an indication of an unsuccessful connection or may otherwise determine that a connection request was unsuccessful. In response, RM 102 may be configured to determine or infer that endpoint E 600 is associated with private network 110.

In step 6, one or more IP addresses and a network location associated with endpoint E 600 may be stored, e.g., at RM storage 104. For example, RM 102 may store an IP address '1008:0bb6:85a3:0000:0000:6a2d:0732:7762' and a network location of 'private' indicating that endpoint E 600 is located in private network 110 and/or that the endpoint is unreachable via the associated IP address.

It will be appreciated that FIG. 6 is for illustrative purposes and that different and/or additional actions may be used. It will also be appreciated that various actions described herein may occur in a different order or sequence.

Figure 7:
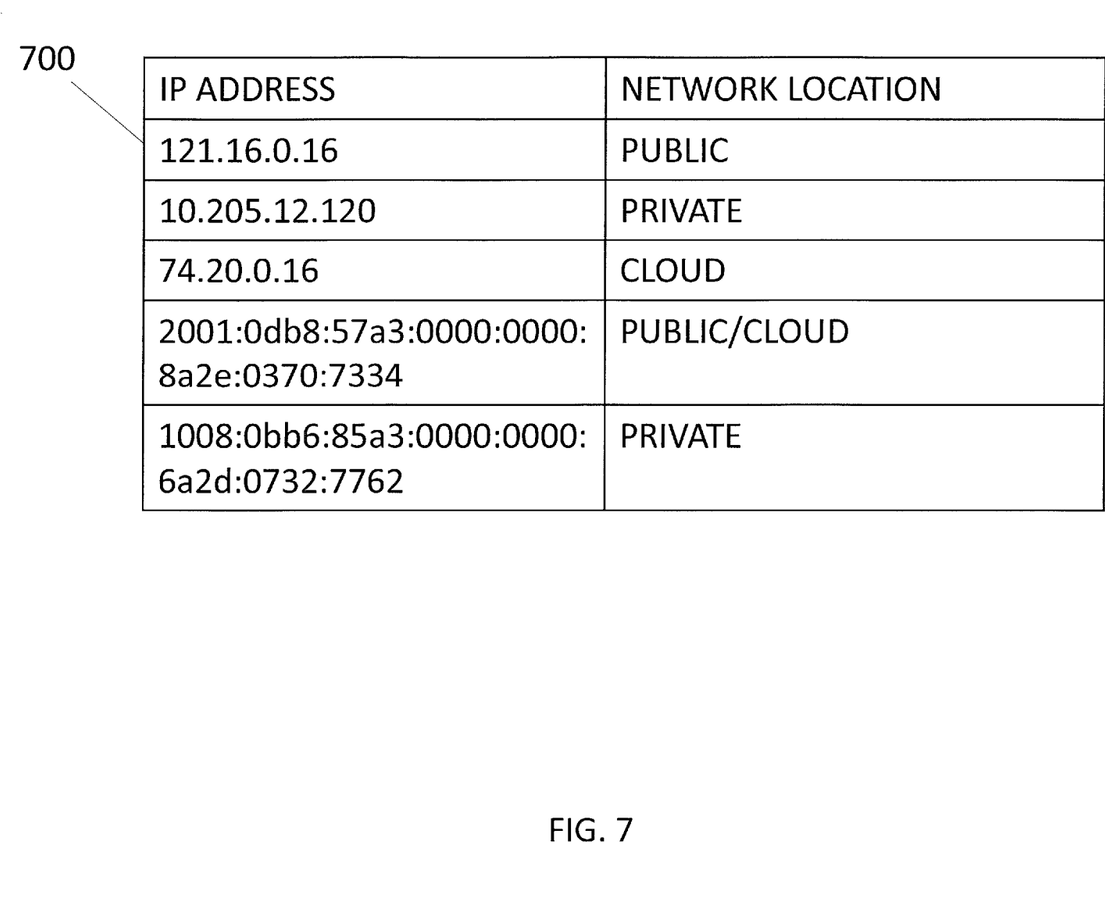
FIG. 7 is a diagram illustrating exemplary registration data according to an embodiment of the subject matter described herein.

FIG. 7 is a diagram illustrating exemplary registration data 700 according to an embodiment of the subject matter described herein. Data 700 may include any suitable information, such as address information, endpoint identifiers, and network location, for identifying information about an endpoint. In some embodiments, data 700 may be obtained or derived from user input, preconfigured logic, and/or other sources. In some embodiments, data 700 may be accessed by computing platform 100, RM 102, and/or another entity and may be stored using various data structures (e.g., in RM storage 104).

Referring to FIG. 7, data 700 may be depicted using a table representing associations between IP addresses and network locations. Each IP address in data 700 may represent any suitable address information for communicating with an endpoint, e.g., an IPv4 address, an IPv6 address, a media access control (MAC) address, and/or port information. In some embodiments, multiple IP addresses may be associated with the same endpoint.

Each network location in data 700 may represent any suitable information for indicating the location and/or reachability of an endpoint. In some embodiments, network location may be represented using words, values, colors, or other information. For example, network location may be represented as integer values, where '0' mean an endpoint is unreachable and/or in private network 110, '1' means an endpoint is reachable (e.g., via a NAT device or other security related device) and/or in semi-public network 116, and '2' means an endpoint is reachable (e.g., without a NAT or other security related device) and/or in public network 120. In another example, network location may be represented as Boolean values, where 'FALSE' mean an endpoint is unreachable (e.g., private network 110) and 'TRUE' means an endpoint is reachable (e.g., semi-public network 116 or public network 120).

It will be appreciated that data 700 in FIG. 7 is for illustrative purposes and that different and/or additional information may also be stored by RM 102.

Figure 8:
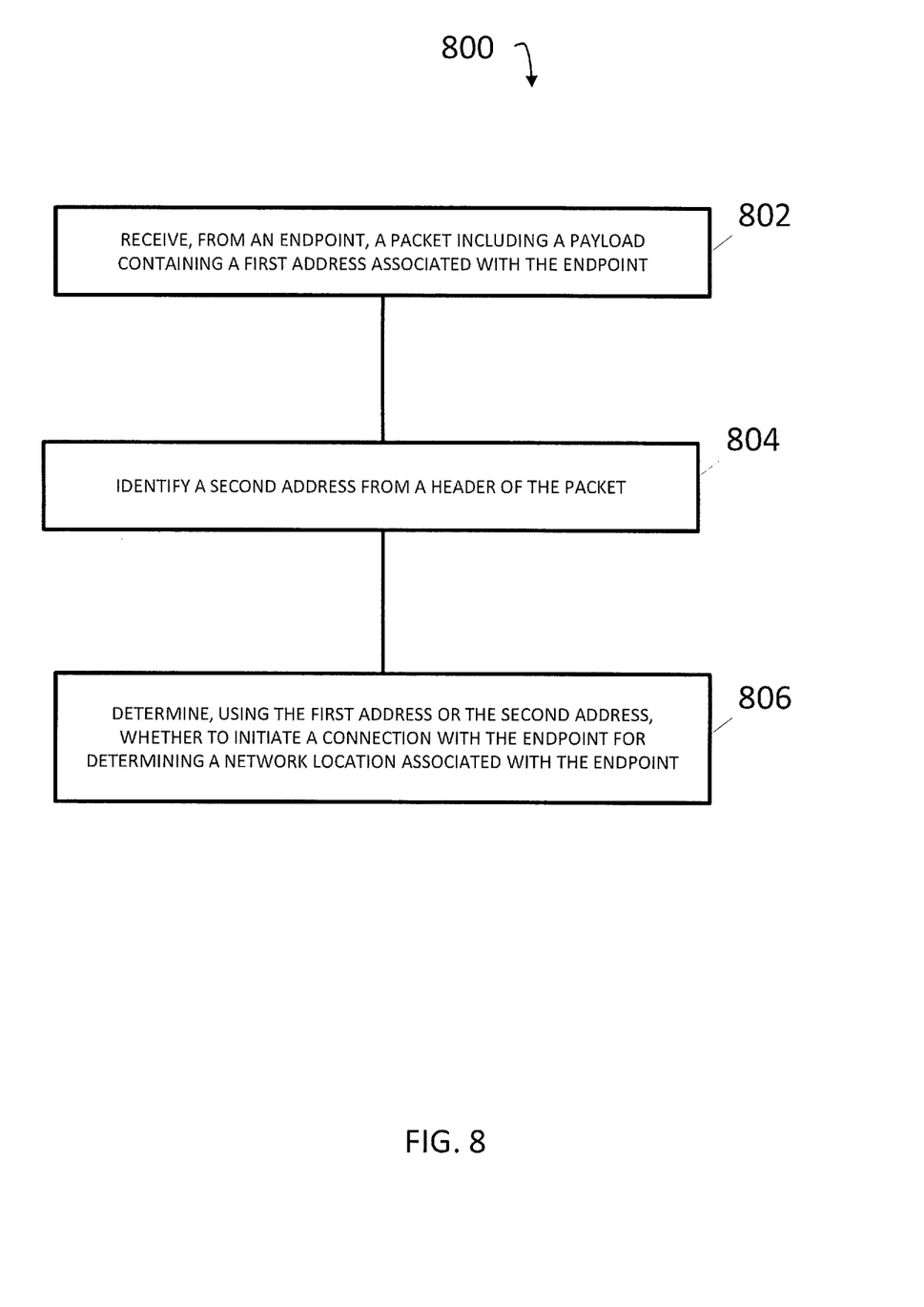
FIG. 8 is a diagram illustrating an exemplary process for identifying a network locations of an endpoint according to an embodiment of the subject matter described herein.

FIG. 8 is a diagram illustrating an exemplary process 800 for identifying a network location associated with an endpoint according to an embodiment of the subject matter described herein. In some embodiments, exemplary process 800, or portions thereof, may be performed by or at computing platform 100, RM 102, and/or another node (e.g., a registration server) or module. In some embodiments, exemplary process 800 may include steps 802, 804, and/or 806.

Referring to process 800, in step 802, a packet including a payload containing a first address associated with an endpoint may be received from the endpoint. For example, a registration server (e.g., a node containing functionality associated with RM 102) located in public network 120 may identify an IP address from a packet payload. In this example, the IP address in the payload may be one of multiple IP addresses usable to communicate with an endpoint.

In step 804, a second address may be identified from a header of the packet. For example, a registration server located in public network 120 may identify a source IP address from a packet header. In this example, the source IP address from the packet header may be usable for communicating with a NAT device and/or an endpoint.

In step 806, it may be determined, using the first address or the second address, whether to initiate a connection with the endpoint for determining a network location associated with the endpoint. For example, using a first address in a packet payload and a second address in a packet header, a registration server located in public network 120 may compare the addresses for determining whether a NAT device is located between an endpoint and the registration server. If a NAT is not detected, the registration server may determine or infer that the endpoint is associated with public network 120. If a NAT is detected, a reverse connection may be initiated and the outcome of the connection may be used to infer whether the endpoint is associated with semi-public network 116 (e.g., connection is successful) or private network 110 (e.g., connection is unsuccessful).

In some embodiments, determining, using a first address or a second address, whether to initiate a connection with the endpoint for determining a network location associated with the endpoint may include determining that the first address and the second address are the same, in response to determining that the first address and the second address are the same, determining not to initiate the connection with the endpoint, and determining that the network location associated with the endpoint is a public network or a semi-public network.

In some embodiments, determining, using a first address or a second address, whether to initiate a connection with the endpoint for determining a network location associated with the endpoint may include in response determining to initiate the connection with the endpoint, initiating, using the second address, a connection with the endpoint, determining whether the connection is successful, and in response to determining that the connection is successful, determining that the network location associated with the endpoint is a public network or a semi-public network.

In some embodiments, initiating a connection (e.g., from computing platform 100 and/or RM 102) to an endpoint may include sending a TCP message (e.g., a TCP SYN message), UDP message, or a connection request message.

In some embodiments, determining that a connection is successful includes receiving, from an endpoint and in response to a message sent by a node (e.g., computing platform 100 and/or RM 102), a TCP message (e.g., a TCP SYN ACK message), UDP message, or a connection request acknowledgement message.

In some embodiments, determining, using a first address or a second address, whether to initiate a connection with the endpoint for determining a network location associated with the endpoint may include initiating, using the second address, a connection with the endpoint, determining whether the connection is successful, and in response to determining that the connection is unsuccessful, determining that the network location associated with the endpoint is a private network.

In some embodiments, determining, using a first address or a second address, whether to initiate a connection with the endpoint for determining a network location associated with the endpoint may include determining that the first address and the second address are IPv6 addresses, initiating, using the second address, a connection with the endpoint, determining whether the connection is successful, and in response to determining that the connection is successful, determining that the network location associated with the endpoint is a public network or a semi-public network.

In some embodiments, determining, using a first address or a second address, whether to initiate a connection with the endpoint for determining a network location associated with the endpoint may include determining that the first address and the second address are IPv6 addresses, in response to determining that the first address and the second address are IPv6 addresses, determining to initiate the connection with the endpoint, initiating, using the second address, a connection with the endpoint, determining whether the connection is successful, and in response to determining that the connection is unsuccessful, determining that the network location associated with the endpoint is a private network.

In some embodiments, a network topology (e.g., a graphical depiction of endpoints within different networks) may be provided using network locations determined for one or more endpoints.

It will be appreciated that exemplary process 800 is for illustrative purposes and that different and/or additional actions may be used. It will also be appreciated that various actions described herein may occur in a different order or sequence.

It should be noted that computing platform 100, RM 102, and/or functionality described herein may constitute a special purpose computing device. Further, computing platform 100, RM 102, a registration server (e.g., a computing platform containing at least processor and configured to perform functionality associated with RM 102) and/or functionality described herein can improve the technological field of testing network nodes by providing mechanisms for automatically identifying network locations associated with various endpoints, thereby alleviating the need to manually input network locations.

The subject matter described herein for identifying network locations associated with endpoints improves the functionality of test platforms and/or test tools by providing mechanisms for automatically determining network topology using identified network locations and/or for using the identified network locations in configuring communications between nodes in a private network, a semi-public network, and/or a public network, e.g., without requiring a test operator to manually enter network locations or identify relevant (e.g., acceptable) communications paths. It should also be noted that a computing platform that implements subject matter described herein may comprise a special purpose computing device (e.g., a registration server) usable for communicating with endpoints in various networks.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying a network location associated with an endpoint, the method comprising:
   at a registration server including at least one processor, the registration server configured to operate in a public network or a semi-public network:
   receiving, from an endpoint, a packet including a payload containing a first address associated with the endpoint;

identifying a second address from a header of the packet; and determining, using the first address or the second address, whether to initiate a connection with the endpoint for determining a network location associated with the endpoint, wherein determining, using the first address or the second address, whether to initiate a connection with the endpoint for determining a network location associated with the endpoint includes:

determining whether the first address and the second address are Internet protocol version 6 (IPv6) addresses;

in response to determining that the first address and the second address are IPv6 addresses, determining to initiate the connection with the endpoint;

initiating, using the second address, the connection with the endpoint;

determining whether the connection is successful; and in response to determining that the connection is successful, determining that the network location associated with the endpoint is the public network or the semi-public network.

2. The method of claim 1 wherein determining, using the first address or the second address, whether to initiate a connection with the endpoint for determining a network location associated with the endpoint includes:

determining whether the first address and the second address are the same;

in response to determining that the first address and the second address are the same, determining not to initiate the connection with the endpoint; and determining that the network location associated with the endpoint is the public network or the semi-public network.

3. The method of claim 1 wherein initiating the connection with the endpoint includes sending a transmission control protocol (TCP) message, a user datagram protocol (UDP) message, or a connection request message.

4. The method of claim 1 wherein determining that the connection is successful includes receiving, from the endpoint and in response to a message sent by the registration server, a transmission control protocol (TCP) message, a user datagram protocol (UDP) message, or a connection request acknowledgement message.

5. The method of claim 1 comprising:

in response to determining that the connection is unsuccessful, determining that the network location associated with the endpoint is a private network.

6. The method of claim 1 comprising:

providing, using the network location, a network topology.

7. A system for identifying a network location associated with an endpoint, the system comprising:

at least one processor;

a registration server including at least one processor, the registration server configured to operate in a public network or a semi-public network, wherein the registration server is configured for:

receiving, from an endpoint, a packet including a payload containing a first address associated with the endpoint;

identifying a second address from a header of the packet; and determining, using the first address or the second address, whether to initiate a connection with the endpoint for determining a network location associated with the endpoint, wherein determining, using the first address or the second address, whether to initiate a connection with the endpoint for determining a network location associated with the endpoint includes:

determining whether the first address and the second address are Internet protocol version 6 (IPv6) addresses;

in response to determining that the first address and the second address are IPv6 addresses, determining to initiate the connection with the endpoint;

initiating, using the second address, the connection with the endpoint;

determining whether the connection is successful; and in response to determining that the connection is successful, determining that the network location associated with the endpoint is the public network or the semi-public network.

8. The system of claim 7 wherein determining, using the first address or the second address, whether to initiate a connection with the endpoint for determining a network location associated with the endpoint includes:

determining whether the first address and the second address are the same;

in response to determining that the first address and the second address are the same, determining not to initiate the connection with the endpoint; and determining that the network location associated with the endpoint is a public network or a semi-public network.

9. The system of claim 7 wherein the registration server is configured to initiate the connection with the endpoint by sending a transmission control protocol (TCP) message, a user datagram protocol (UDP) message, or a connection request message.

10. The system of claim 7 wherein the registration server is configured to determine that the connection is successful by receiving, from the endpoint and in response to a message sent by the registration server, a transmission control protocol (TCP) message, a user datagram protocol (UDP) message, or a connection request acknowledgement message.

11. The system of claim 7 comprising:

in response to determining that the connection is unsuccessful, determining that the network location associated with the endpoint is a private network.

12. The system of claim 7 wherein the registration server is configured to provide, using the network location, a network topology.

13. A non-transitory computer readable medium having stored thereon executable instructions embodied in the computer readable medium that when executed by a processor of a computer control the computer to perform steps comprising:

receiving, from an endpoint, a packet including a payload containing a first address associated with the endpoint;

identifying a second address from a header of the packet; and determining, using the first address or the second address, whether to initiate a connection with the endpoint for determining a network location associated with the endpoint, wherein determining, using the first address or the second address, whether to initiate a connection with the endpoint for determining a network location associated with the endpoint includes:

determining whether the first address and the second address are Internet protocol version 6 (IPv6) addresses;

in response to determining that the first address and the second address are IPv6 addresses, determining to initiate the connection with the endpoint;

initiating, using the second address, the connection with the endpoint;

determining whether the connection is successful; and in response to determining that the connection is successful, determining that the network location associated with the endpoint is the public network or the semi-public network.

14. The non-transitory computer readable medium of claim 13 wherein determining, using the first address or the second address, whether to initiate a connection with the endpoint for determining a network location associated with the endpoint includes:

determining whether the first address and the second address are the same;

in response to determining that the first address and the second address are the same, determining not to initiate the connection with the endpoint; and determining that the network location associated with the endpoint is a public network or a semi-public network.

15. The non-transitory computer readable medium of claim 13 comprising:

in response to determining that the connection is unsuccessful, determining that the network location associated with the endpoint is a private network.

\* \* \* \* \*